Figure 1:
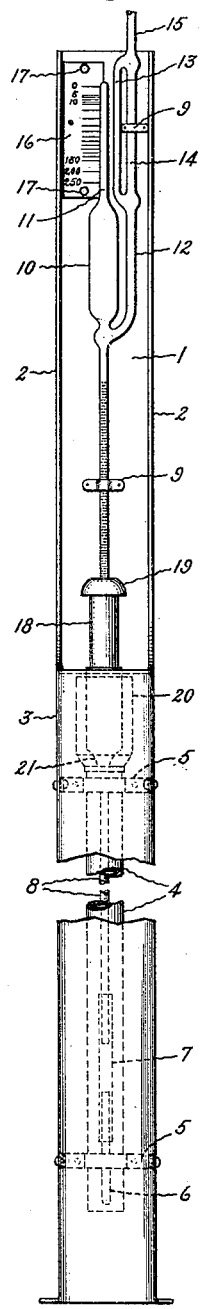

Aug. 9, 1932.  C. V. HARDY ET AL  1,871,410

LIQUID PRESSURE MEASURING APPARATUS

Filed July 18, 1929

Inventors:
Clyde V. Hardy,
Philip J. Johnston,
by Charles V. Tullar
Their Attorney.

Patented Aug. 9, 1932

1,871,410

UNITED STATES PATENT OFFICE

CLYDE V. HARDY AND PHILIP J. JOHNSTON, OF SCHENECTADY, NEW YORK, ASSIGNORS TO GENERAL ELECTRIC COMPANY, A CORPORATION OF NEW YORK

LIQUID PRESSURE MEASURING APPARATUS

Application filed July 18, 1929. Serial No. 379,299.

The present invention relates to measuring apparatus and more particularly to devices for determining the degree of vacuum in a partially evacuated envelope or the pressure of a gaseous medium in a closed container.

Devices of this character usually employ a liquid for measuring purposes, the level of the liquid being controlled by a plunger-cylinder arrangement which serves to displace the liquid in a reservoir which is located at one end of a U-shaped tube, thus raising the level of the liquid in both sides of the U-shaped tube. The end of the U-shaped tube containing the reservoir is open to the atmosphere and the other end terminates in two parallel paths or tubes of constricted size. One of the two parallel paths communicates with the envelope containing the gaseous medium whose pressure is to be determined. The other parallel path or tube is closed and is adapted to receive a relatively small quantity of the medium which is compressed therein by the liquid column. The liquid is also admitted to the parallel tube which is open to the envelope, the liquid rising to a higher level in this path than in the path containing the compressed gas. The difference in the levels of the liquid provides a liquid column whose weight balances the preponderance of pressure of the compressd gas over that of the gas in the envelope and this difference may be calibrated in terms of gas pressure as measured from the vacuum standard. When the plunger is raised in the cylinder, the parallel tubes are emptied of the liquid which then assumes its original position in the U-tube.

It has been found that in the ordinary types of liquid gages, wherein the liquid reservoir is of large content in order to store sufficient liquid for columns of appreciable length and the column areas are small in order to register large variations of length for relatively small changes in the height of the reservoir, there is danger of spillage of the liquid if the plunger is pressed into the cylindrical reservoir at a velocity greater than that with which the columns can absorb the liquid forced into them by the operation of the plunger. Spillage of the liquid may also be caused when the plunger is depressed, even at normal velocity, and a condition of no vacuum, or substantially no vacuum, exists in the system as when a leak develops or the pump stops operating for a considerable length of time. Under these conditions, the spillage usually takes place around the plunger which must fit into the cylinder rather loosely in order to allow the atmosphere free access to the surface of the reservoir liquid and to minimize friction between the plunger and the cylinder. Inasmuch as liquid pressure gages ordinarily employ mercury as the liquid due to the fact that it has a large molecular weight and hence is adapted to producing liquid columns of practical length, the spillage of this material represents an item of considerable expense as well as offering the possibility of mercury poisoning. While spillage of the mercury may be reduced in large degree by careful operation, it has been found that in a standard gage under normal conditions of operation mercury is occasionally spilled.

Figure 2:
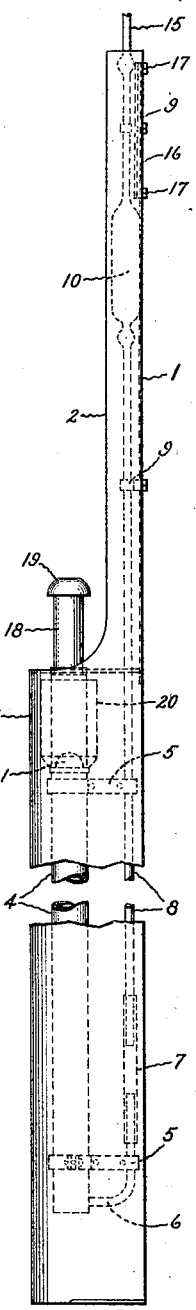
Figure 3:
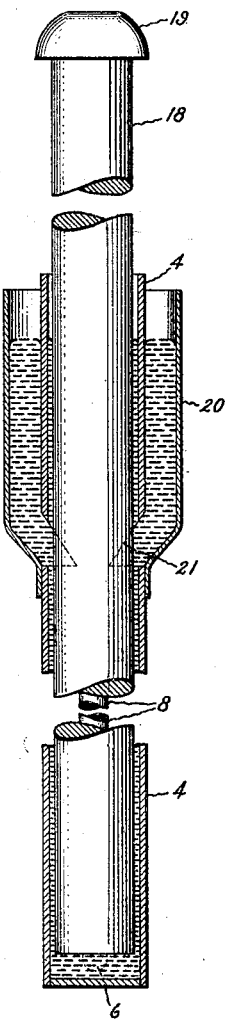
Figure 4:
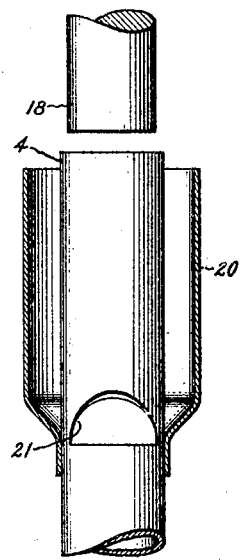

One of the objects of our invention is to provide an accessory to liquid pressure gages of the plunger type which will allow the plunger to be pressed into the liquid reservoir at any practical rate of speed or with no vacuum on the gage, without causing spillage of the liquid. Another object is to provide a device of this character which will be inexpensive to manufacture, also of rugged and simple construction and readily adaptable to existing forms of gages. These objects are attained in brief by providing an overflow chamber communicating with the upper portion of the liquid reservoir so that if the plunger is depressed too rapidly or there is present any other condition which normally would cause spillage, the mercury or other liquid flows into the chamber instead of being forced out around the plunger. Other objects and features will be apparent as the specification is perused in connection with the accompanying drawing in which Fig. 1 is a front elevational view, with a part broken away, of the liquid gage made in accordance with our invention; Fig. 2 is a side elevational view of the improved gage shown in Fig. 1; Fig. 3 is an enlarged view of the plunger, liquid reservoir and overflow chamber, the plunger being shown in its normally depressed position; while Fig. 4 is a view illustrating the openings which communicate between the chamber and the reservoir, the plunger being entirely removed from the reservoir.

Referring to the drawing, numeral 1 designates a back plate or wall member which extends over a portion of the length of a frame, fabricated of metal or wood and provided with two side flanges 2, 2; the flanges extend the entire length of the frame and are joined together at the lower portion for a distance of approximately one-half the length of the frame by a semi-circular enclosure or housing 3 closed at the top except for a plunger opening. Within the enclosure there is a metal pipe or cylinder 4 supported in an upright manner by two clamp brackets 5 secured to the members 2. The lower end of the pipe 4 carries a small transversely extending conduit 6 which is bent upward vertically to receive a flexible rubber tubing 7. The tubing joins on to a glass tube 8 which extends the entire length of the frame to form a forked system. The tube 8 may be secured to the back member 1 by brackets 9 or in any other suitable manner. One portion of the forked system is enlarged to constitute a chamber 10, the upper end of which is reduced to a tube 11, usually of capillary dimension, of strictly uniform bore, and having its upper end closed. At the lower end of the enlarged portion 10, a tube 12 is taken off and extended upwardly to form two parallel branches 13, 14, the one nearer the tube 11 having the same internal diameter as the latter. The two branches are joined together again near the upper extremity of the frame to form a tubing 15 which is sealed to the envelope being evacuated which may be connected to the pump line. There is a pressure reading scale 16 mounted on the back plate 1 by bolts 17 behind and along one side of the closed tube member 11, the zero of the scale being located at the upper end of the capillary 11. In order to force mercury or other liquid into the forked portion of the gage for determining the pressure in the rarefied system, a plunger 18 is provided which is slidably mounted in the cylinder 4. The plunger terminates at the top in a hand knob 19 for convenience in applying a downward pressure to the plunger.

It has been found that when the plunger is depressed with no vacuum on the gage or is pressed downwardly at a velocity such that the liquid-absorbing capacity of the gage is exceeded, i. e. when the internal volume of the tube system is too small to accommodate the flow of liquid at the excessive rate displaced by the plunger, a part of the liquid tends to flow back toward the top of the plunger and between the latter and the interior surface of the pipe. This liquid, unless restrained in some manner, will spill over the top where the plunger enters the pipe cylinder.

In accordance with our invention, an overflow chamber is provided near the upper end of the pipe in order to receive the liquid forced back in this manner, and thereby to prevent spillage. The chamber may take the form of a cup-shaped member 20 tapered down at one end to an internal diameter snugly to fit over the pipe member 4 to which it is secured by welding or in any other suitable manner. The capacity of the member 20 should be sufficient to take care of the mercury even when the plunger 18 touches the bottom of the cylinder with no vacuum on the gage and thereby displaces the maximum amount of liquid. In the cylinder 4, just above the place where the cup member is secured, there is a pair of apertures or openings 21 of any suitable shape through which the excess liquid may pass to the over-flow chamber. It will be evident that if the plunger is depressed with no vacuum on the gage or at an excessive velocity, the liquid which normally would spill around the periphery of the plunger at the top now flows temporarily through communicating passages 21 into the chamber 20. It will be noted that the presence of the servoir in no way interferes with the passage of liquid into the measuring portion of the system and furthermore, exercises its liquid-absorbing function only in the event of the danger of spilling mercury from improper operation.

The operation of the device for measuring pressure is well known in the art. It will be sufficient to state that the gas whose pressure is to be determined is trapped in the enlarged portion 10 and compressed in the closed tube 11 so that when the column of mercury is forced against the pressure of the trapped gas, the height of the mercury column will be less than the height of the column in the branched system 13, 14. The difference in height of the two columns conveniently is read on the scale 16 which obviously gives a reading of pressure which may be translated into vacuum or pressure standards.

It has been found in practice that the overflow chamber accessory successfully prevents the spilling of mercury from careless operation under any condition that has been encountered. Moreover, the arrangement is such that this chamber is entirely concealed within the housing 3 hence the mercury gathered therein remains free from contamination and the construction is simple and rugged. The chamber accessory has the additional advantage of being readily adaptable to the standard line of gages.

What we claim as new and desire to secure by Letters Patent of the United States, is,—

1. In a liquid pressure gage, means for determining the pressure of a rarefied system, said means including a plurality of liquid-containing tubes, means for moving the liquid in said tubes for measuring purposes, the gage being normally characterized by spillage of liquid when the liquid-moving means is improperly operated, and means secured to the gage and cooperating therewith for preventing spillage of liquid under all conditions of operation of the liquid-moving means.

2. In a liquid pressure gage, means for determining the pressure of a rarefied system, said means including a plurality of liquid-containing tubes terminated by a cylinder, a plunger adapted to be forced into the cylinder to move the liquid into a pressure-reading position, the arrangement being normally characterized by spillage of liquid around the plunger when the latter is improperly operated, and means secured to the gage and cooperating therewith for preventing spillage of the liquid between the cylinder and plunger when the plunger is improperly operated, said means comprising a chamber communicating with the cylinder.

3. In a liquid pressure gage, means for determining the pressure of a rarefied system, said means including a plurality of glass tubes terminated by a cylinder, a plunger adapted to be forced into the cylinder to move the liquid into a pressure-reading position, the arrangement being normally characterized by spillage of liquid from the cylinder when the plunger is moved at an excessive velocity, and means for preventing spillage of the liquid at excessive plunger velocities, said means comprising a cup-shaped member secured to the cylinder and provided with an opening communicating with the cylinder.

4. In a liquid pressure gage, means for determining the pressure of a rarefied system, said means comprising a plurality of liquid-containing tubes terminated by a cylinder, a plunger adapted to be forced into the cylinder to move the liquid into a pressure-reading position, the arrangement being normally characterized by spillage of the liquid around the plunger when the latter is improperly operated and means secured to the gage and cooperating therewith for preventing spillage of the liquid between the cylinder and the liquid when the plunger is improperly operated, said means comprising a chamber mounted on the cylinder and containing openings at the bottom which communicate with the end of the cylinder, said openings being adapted to receive the liquid which would normally spill and to permit return of the liquid from the chamber to the cylinder when the danger of spillage is over.

In witness whereof, we have hereunto set our hands this 17th day of July, 1929.

CLYDE V. HARDY.
PHILIP J. JOHNSTON.